United States Patent
Palanisamy

(10) Patent No.: US 11,038,781 B2
(45) Date of Patent: Jun. 15, 2021

(54) SYSTEM AND METHOD FOR TRACKING AND MANAGING ONE OR MORE DEVICES IN A DYNAMIC NETWORK

(71) Applicant: AppViewX Inc., Seattle, WA (US)

(72) Inventor: Muralidharan Palanisamy, Gold River, CA (US)

(73) Assignee: AppViewX Inc., Seattle, WA (US)

( * ) Notice: Subject to any disclaimer, the term of this patent is extended or adjusted under 35 U.S.C. 154(b) by 74 days.

(21) Appl. No.: 16/663,240

(22) Filed: Oct. 24, 2019

(65) Prior Publication Data

US 2020/0136941 A1 Apr. 30, 2020

Related U.S. Application Data

(60) Provisional application No. 62/750,761, filed on Oct. 25, 2018.

(51) Int. Cl.
| | |
|---|---|
| *G06F 15/173* | (2006.01) |
| *H04L 12/26* | (2006.01) |
| *G06F 16/23* | (2019.01) |
| *H04L 12/24* | (2006.01) |
| *H04L 29/12* | (2006.01) |

(52) U.S. Cl.
CPC .......... *H04L 43/06* (2013.01); *G06F 16/2379* (2019.01); *H04L 41/06* (2013.01); *H04L 41/28* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 2009/0080408 A1* | 3/2009 | Natoli | ..................... | H04L 49/35 370/351 |
| 2016/0323239 A1* | 11/2016 | Cheng | ..................... | H04L 67/22 |

* cited by examiner

*Primary Examiner* — Brian Whipple
*Assistant Examiner* — Gregory P Tolchinsky

(57) ABSTRACT

A method of tracking and managing the one or more devices 106A-N in one or more networks 108A-N is provided. The method includes following steps: (i) obtaining information of the one or more devices 106A-N: (ii) creating an ID to a device; (iii) monitoring the one or more devices 106A-N to identify the switching of the one or more devices 106A-N between the one or more networks 108A-N; (iv) updating a workflow of the device when the device switched to a new network from the one or more networks 108A-N; (v) generating a detailed report on all the actions performed on that particular device.

14 Claims, 5 Drawing Sheets

SYSTEM AND METHOD FOR TRACKING AND MANAGING ONE OR MORE DEVICES IN A DYNAMIC NETWORK

BACKGROUND

Technical Field

The embodiments herein generally relate to a device management system, and more particularly, to a system and method for tracking and managing one or more devices within one or more dynamic networks using a unique identifier.

Description of the Related Art

Dynamic Networks are networks in which the network topology changes over time. Generally, devices are constantly moved from one place to another place which leads to a respective change in Internet Protocol (IP) of the devices. The dynamic networks are adapted to the changes in the IP of the devices. These changes are constantly occurring and the dynamic network has to adapt to these changes. All the devices in the dynamic network, for example, an end host, firewall, proxy, load balancer, router etc, are required to have an identifier that is unique to itself and can be used for any actions that would be executed against that device. A device identifier needs to be constant such that any change in the dynamic network does not alter this parameter. Therefore, some parameter is required that remains constant for a particular device. An IP address, a 32-bit numeric address, is an identifier for a computer or device on a TCP/IP network. The dynamic networks using the TCP/IP protocol route messages based on the IP address of a destination. With the advancement of technology, the Dynamic network structure is implemented to meet constantly changing needs. Earlier, the IP address was a unique identifier for a network device. But, with the advent of DHCP enabled environment, the devices physically moved to different data centers, manual interventions etc., there exists a requirement for an identifier that does not vary under any circumstance such that any changes implemented against this identifier are made only to that identifier.

The main drawback of having a dynamic network is that although the IP might be the same, the device need not be the same as the device in which a previous update was received. Thus, the need of the hour is to have a device identifier unique to each device so that implementation is done only in that particular device.

Accordingly, there remains a need for a system and method for continuous tracking and managing the devices in a dynamic network system for the effective functioning of the network and the devices.

SUMMARY

In view of the foregoing, an embodiment herein provides a device management system for tracking and managing one or more devices within one or more dynamic networks using a unique identifier. The device management system includes (a) a memory unit that stores a database and a set of instructions. The database includes at least one of (i) a Unique Identification (ID) associated with the one or more devices, (ii) a Unique Internet Protocol (IP) address associated with the one or more dynamic networks, (b) a processor that executes the set of instructions and is configured to (i) obtain (a) information associated with one or more devices that are communicated with a first dynamic network from one or more dynamic networks and (b) a unique Internet Protocol (IP) address associated with the one or more dynamic networks, (ii) generate a unique identification (ID) for each device that is communicated with the first dynamic network from one or more dynamic networks using a certificate that corresponds to each device, (iii) identify switching of the one or more devices within the one or more dynamic networks by analysing a configuration of the unique ID of the one or more devices with an IP address of the one or more dynamic networks, (iv) generate a report for actions performed on one or more devices at periodical instance by analysing the switching of the one or more devices within the one or more dynamic networks and (v) enable an admin or a user to track and manage the one or more devices within the one or more dynamic networks by providing an alert based on the instances performed on each device. The information associated with the one or more devices is stored in the database.

In some embodiments, the processor is configured to automatically update the workflow for the device that is switched when the unique ID of the switched device is configured with a new IP address.

In some embodiments, information associated with the one or more devices includes at least one of device name, a device locality, a device state or a device certificate.

In some embodiments, the processor is configured to enable the admin or the user, using the user interface, to generate the unique ID of the device based on the certificate of the device and the IP address of the dynamic network that the device connects with.

In some embodiments, the processor is configured to map the actions of each device to generate the report. The processor is configured to enable the admin or user to access the generated report using the user interface to track and manage the one or more devices configured in the one or more dynamic networks.

In some embodiments, the processor is configured to automatically generate a workflow to update security policies in the first dynamic network from one or more dynamic networks based on a new IP address of the one or more devices when the unique ID of the one or more devices that is switched within the one or more dynamic networks.

In one aspect, a method for tracking and managing one or more devices within one or more dynamic networks using a unique identifier using a device management system. The method includes (i) obtaining (a) information associated with the one or more devices that is communicated with a first dynamic network from the one or more dynamic networks, (b) a unique Internet Protocol (IP) address associated with the one or more dynamic networks, (ii) generating a unique identification for each device that is communicated with the first dynamic network from one or more dynamic networks using a certificate that corresponds to each devices, (iii) identifying a switching of a device within the at least one dynamic network of by analysing a configuration of the unique ID of each device with at least one of an IP address of the one or more dynamic networks, (iv) generating a report for actions performed on one or more devices at periodical interval by analysing the switching of the one or more devices within the one or more dynamic networks and (v) enabling an admin or a user to track and manage the one or more devices within the one or more dynamic networks by providing an alert based on the instances performed on each device.

In some embodiments, the method includes enabling the admin or the user, using the user interface, to generate the unique ID of the device based on the certificate of the device and the IP address of the dynamic network that the device connects with.

In some embodiments, the method includes mapping the actions of each device to generate the report and enabling the admin or user to access the generated report using the user interface to track and manage the one or more devices configured in the one or more dynamic networks.

In some embodiments, the method includes automatically generating a workflow to update security policies in the first dynamic network from one or more dynamic networks based on a new IP address of the one or more devices when the unique ID of the one or more devices that are switched within the one or more dynamic networks.

In some embodiments, the method includes automatically generating a workflow to update security policies in the first dynamic network from one or more dynamic networks based on a new IP address of the one or more devices when the unique ID of the one or more devices that is switched within the one or more dynamic networks.

In one aspect, one or more non-transitory computer-readable storage mediums storing the one or more sequences of instructions, which when executed by one or more processors, further causes a method for tracking and managing one or more devices within one or more dynamic networks using a unique identifier using a device management system. The method includes (i) obtaining (a) information associated with the one or more devices that is communicated with a first dynamic network from the one or more dynamic networks, (b) a unique Internet Protocol (IP) address associated with the one or more dynamic networks, (ii) generating a unique identification for each device that is communicated with the first dynamic network from one or more dynamic networks using a certificate that corresponds to each devices, (iii) identifying a switching of a device within the at least one dynamic network of by analysing a configuration of the unique ID of each device with at least one of an IP address of the one or more dynamic networks, (iv) generating a report for actions performed on one or more devices at periodical interval by analysing the switching of the one or more devices within the one or more dynamic networks, (v) enabling an admin or a user to track and manage the one or more devices within the one or more dynamic networks by providing an alert based on the instances performed on each device.

In some embodiments, the method includes enabling the admin or the user, using the user interface, to generate the unique ID of the device based on the certificate of the device and the IP address of the dynamic network that the device connects with.

In some embodiments, the method includes automatically generating a workflow to update security policies in the first dynamic network from one or more dynamic networks based on a new IP address of the one or more devices when the unique ID of the one or more devices that is switched within the one or more dynamic networks.

In some embodiments, the method includes mapping the actions of each device to generate the report and enabling the admin or user to access the generated report using the user interface to track and manage the one or more devices configured in the one or more dynamic networks.

The advantages of the device management system 102 as follows: for each device associated with the network a device identifier (ID) is created that is helpful to make and track changes made to the device. Apart from the creation of the identifier, the user can also create Security policies, NAT rules or any other configuration by providing the device ID without specifically tracking all the changes across the network. This process eases the task of manual intervention for tracking the changes in the network with effective time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
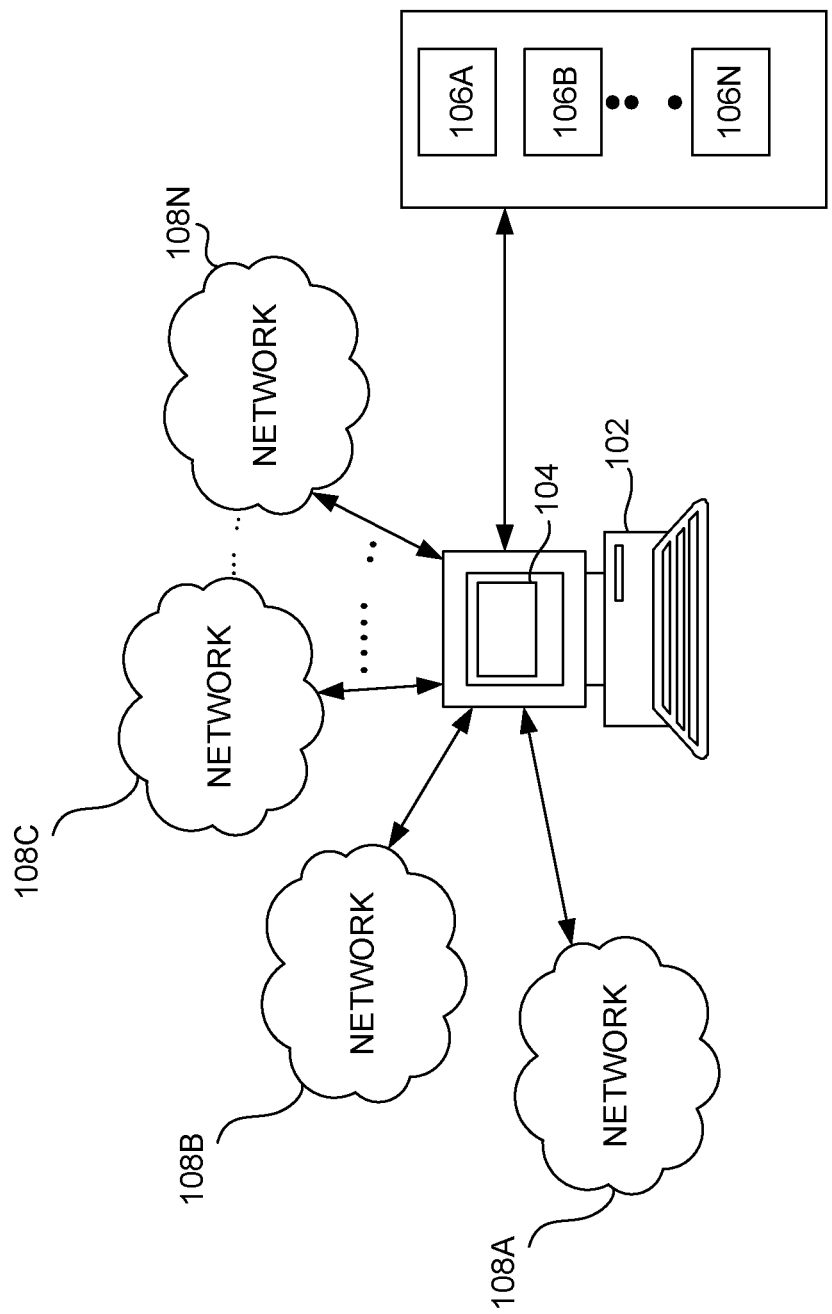
FIG. 1 illustrates a system view of a device management system for tracking and managing one or more devices connected within one or more dynamic networks according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for continuous tracking and managing the one or more devices within one or more dynamic networks for the effective functioning of the network and the devices. Referring now to the drawings, and more particularly to FIGS. 1 through 5, where similar reference characters denote corresponding features consistently throughout the figures, there are shown preferred embodiments.

FIG. 1 illustrates a system view of a device management system 102 for tracking and managing one or more devices 106A-N connected within one or more networks 108A-N according to an embodiment herein. The one or more devices 106A-N is connected with the one or more networks 108A-N at any instance. In an embodiment, the one or more devices 106A-N may include servers, end hosts, firewalls, Routes or load balances etc. The one or more devices 106A-N includes a unique Identification (ID) that is created by the device management system 102 using a certificate of the one or more devices 106A-N. In an embodiment, the certificate includes one more information of name, locality, state etc. which relates to the one or more devices 106A-N. The one or more networks 108A-N includes a unique Internet protocol (IP) address. The ID of the one or more devices 106A-N and the IP address of the networks 108A-N are stored in a database of the system 102. In an embodiment, the device management system 102 allows an admin/a user to create the ID for a device 106 while creating at least one component for the device 106 using the user interface 104. The device management system 102 continuously monitors whether the ID of the device 106 is associated with the same IP address from the one or more networks 108A-N to identify a switching of the device 106 between one or more networks 106A-N. The switching of the device 106 is identified using the device ID that is created based on the certificate of the device 106. In an embodiment, the device management system 102 monitors certificates that relate to each device ID at the periodical instance to check whether the ID is connected in the same IP address of the dynamic network 108 or not.

In an embodiment, the IP associated with the device ID is visible on the user interface 104 by clicking the device ID value as Nested Popup. The device management system 102 updates the database with a new IP address of the dynamic network 108 when the device 106 is switched from a IP address from the one or more dynamic network 108A-N. The device management system 102 automatically creates a workflow for the device to update security policies based on the new IP address of the device 106 when the unique ID of the one or more devices 106A-N that are switched within the one or more dynamic networks 108A-N. In an embodiment, the device management system 102 enables the user to approve the implementation of the created workflow. The device management system 102 stores information relates to actions performed on the one or more devices 106A-N and the one or more networks 108A-N using the database and generates a summary report at the periodical interval. The device management system 102 alerts the admin or the user when the device ID is switched between the IP address of the one more network 108A-N and enables the admin or the user to track and manage the one or more devices 106A-N within the one or more dynamic networks 108A-N. In an embodiment, the admin or the user can configure the alert notification based on the requirement.

Figure 2:
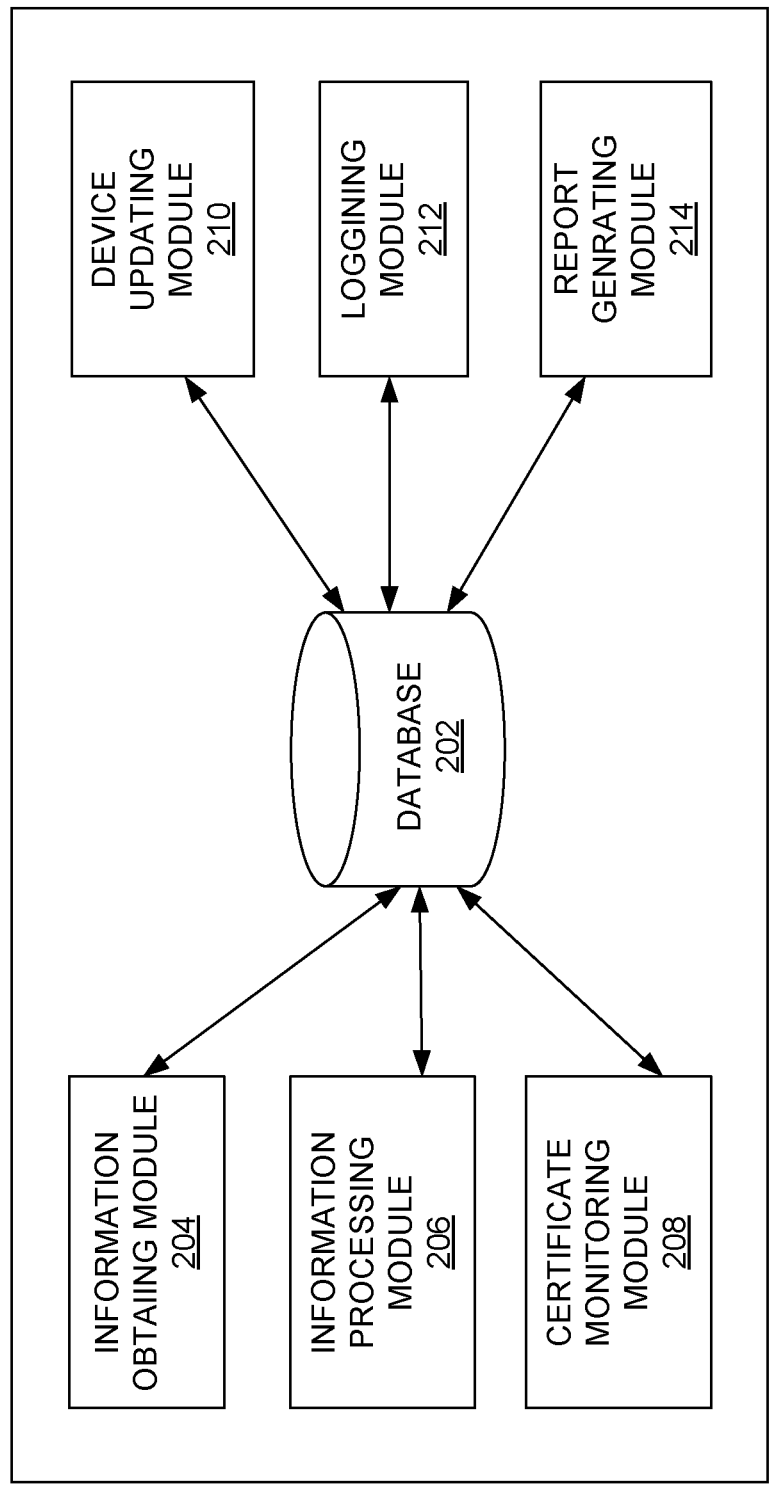
FIG. 2 illustrates an exploded view of the device management system of FIG. 1 according to an embodiment herein.

FIG. 2 illustrates an exploded view of the device management system 102 of FIG. 1 according to an embodiment herein. The system 102 includes a database 202, an information obtaining module 204, an information processing module 206, a certificate monitoring module 208, a device updating module 210, a logging module 212 and a report generating module 214. The information obtaining module 204 obtains information of the particular device 106 communicating with a particular network IP address from the one or more dynamic networks 108A-N. In some embodiment, the one or more devices 106A-N may include servers, end hosts, firewalls, Routes or load balances etc. The information obtained using the information obtaining module 204 relates to a device name, a device locality, a device state etc. The information obtaining module 204 obtains IP addresses of the one or more dynamic networks 108A-N and stored in the database 202. The logging module 212 updates with the ID of the device 106 and the associated network IP address of the dynamic network 108.

The information processing module 206 creates a unique Identification (ID) to the device 106 using the obtained information. In some embodiment, the device management system 102 enables the admin or the user to customize the device ID based on the requirement. The certificate monitoring module 208 monitors the IP address of the one or more devices 106A-N with the periodical instance to check whether the ID is connected in the same the IP address of the dynamic network 108 or not. When the ID of the device 106 is switched to another network IP address from the current IP address of the network 108 using the certificate monitoring module 208. The certificate monitoring module 208 updates the logging module 212 with a new IP address of the device 106 when the ID of the device 106 is switched to another network IP address from the current IP address of the network 108. The device updating module 210 creates or updates a workflow for the device 106 when the system 102 identifies that the device ID is updated with the new IP address. In an embodiment, the device updating module 210 implements the created or updated workflow in the device 106 when at least one of the system 102 or the admin/the user approves the created or updated workflow. The logging module 212 maps the changes made to the device 106 connected with the dynamic network 108 while switching. In an embodiment, the logging module 212 stores information related to all the changes made to the device 106 and the time in which the changes were made. The report generating module 214 generates a report on all the actions performed on the particular device 106. In an embodiment, the device management system 102 generates a report for actions performed on one or more devices at a periodical interval by analyzing the switching of the one or more devices within the one or more dynamic networks. The device management system 102 enables the admin or the user to configure the report based on the requirement. In an embodiment, the automated workflow process requires user approval before making changes. The manual intervention is provided to track changes in order to avoid accidental changes.

Figure 3:
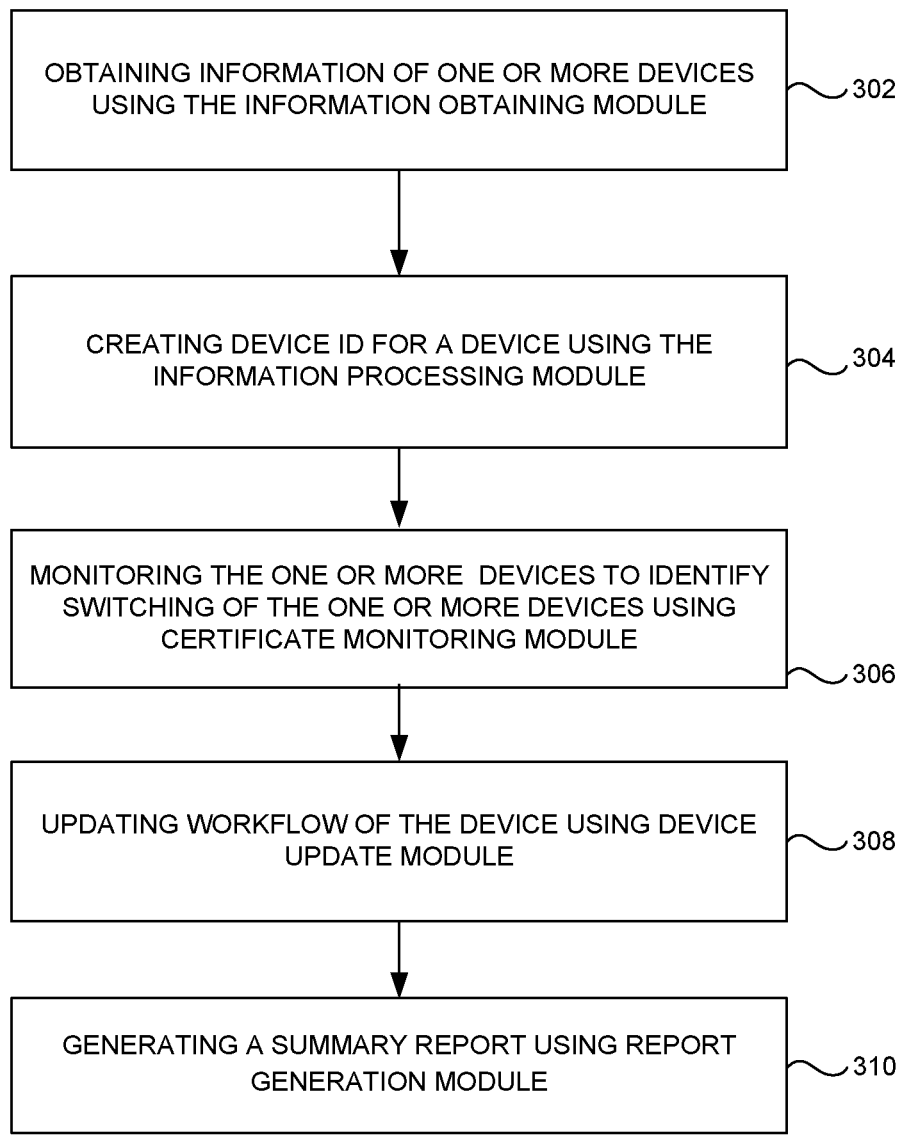
FIG. 3 is a flow diagram illustrating a computer-implemented method for tracking and managing the one or more devices within the one or more dynamic networks using the device management system of FIG. 2 according to an embodiment herein.

FIG. 3 is a flow diagram illustrating a computer-implemented method for tracking and managing the one or more devices within the one or more dynamic networks using the device management system of FIG. 2 according to an embodiment herein. At step 302, the information associated with one or more devices 106A-N and one or more networks 108A-N are obtained using the information obtaining module 204. At step 304, an ID to the device 106 is created using the information processing module 206 using a certificate of the one or more devices 106A-N. At step 306, the IP address of the one or more devices 106A-N is monitored with a periodical time interval to identifying the switching using the certificate monitoring module 208. When the device 106 is switched to a new network, the device ID is mapped with the corresponding IP address of the dynamic network 108 from the one or more networks 106A-N. In some embodiment, the device management system 102 continuously checking if the device 106 is mapped to the same IP address of the dynamic network 108 or not.

The device management system 102 updates the database 202 with a new IP address of the dynamic network 108 when the device switched to another IP address from the one or more dynamic networks 108A-N. At step 308, the workflow of the one or more devices 106A-N created using the device updating module 210 when the one or more devices 106A-N switched within the one or more networks 108A-N. In an embodiment, the system 102 enables the admin or the user to approve the workflow to configure with the device 106. At step 310, a report is generated for all the actions performed on the particular device 106 using the report generating module 214. In some embodiment, the report generating module 214 enables the admin or the user to access the report using the user interface 104.

Figure 4:
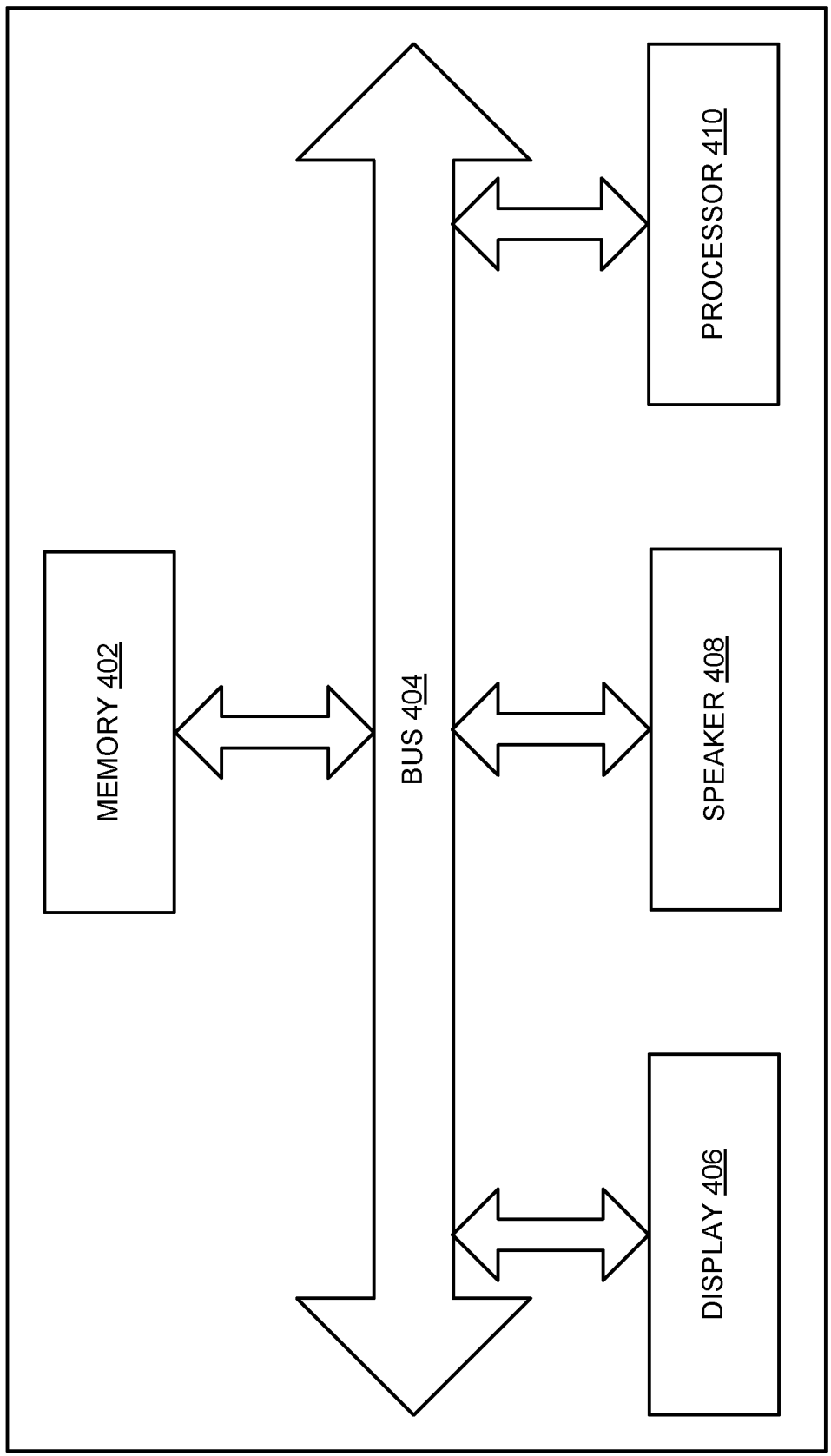
FIG. 4 illustrates an exploded view of a receiver of FIG. 1 according to an embodiment herein.

FIG. 4 illustrates an exploded view of a device management system 102 of FIG. 1 having a memory 402 having a set of instructions, a bus 404, a display 406, a speaker 408 and a processor 410 capable of processing the set of instructions to perform any one or more of the methodologies herein, according to an embodiment herein. The processor 410 may also enable digital content to be consumed in the form of a video for output via one or more displays 406 or audio for output via speaker and/or earphones 408. The processor 410 may also carry out the methods described herein and in accordance with the embodiments herein.

Digital content may also be stored in the memory 402 for future processing or consumption. The memory 402 may also store program-specific information and/or service information (PSI/SI), including information about digital content (e.g., the detected information bits) available in the future or stored from the past. A user of the receiver 400 may view this stored information on display 406 and select an item of for viewing, listening, or other uses via input, which may take the form of a keypad, scroll, or another input device (s) or combinations thereof. When digital content is selected, the processor 410 may pass information. The content and PSI/SI may be passed among functions within the receiver using the bus 404.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 5:
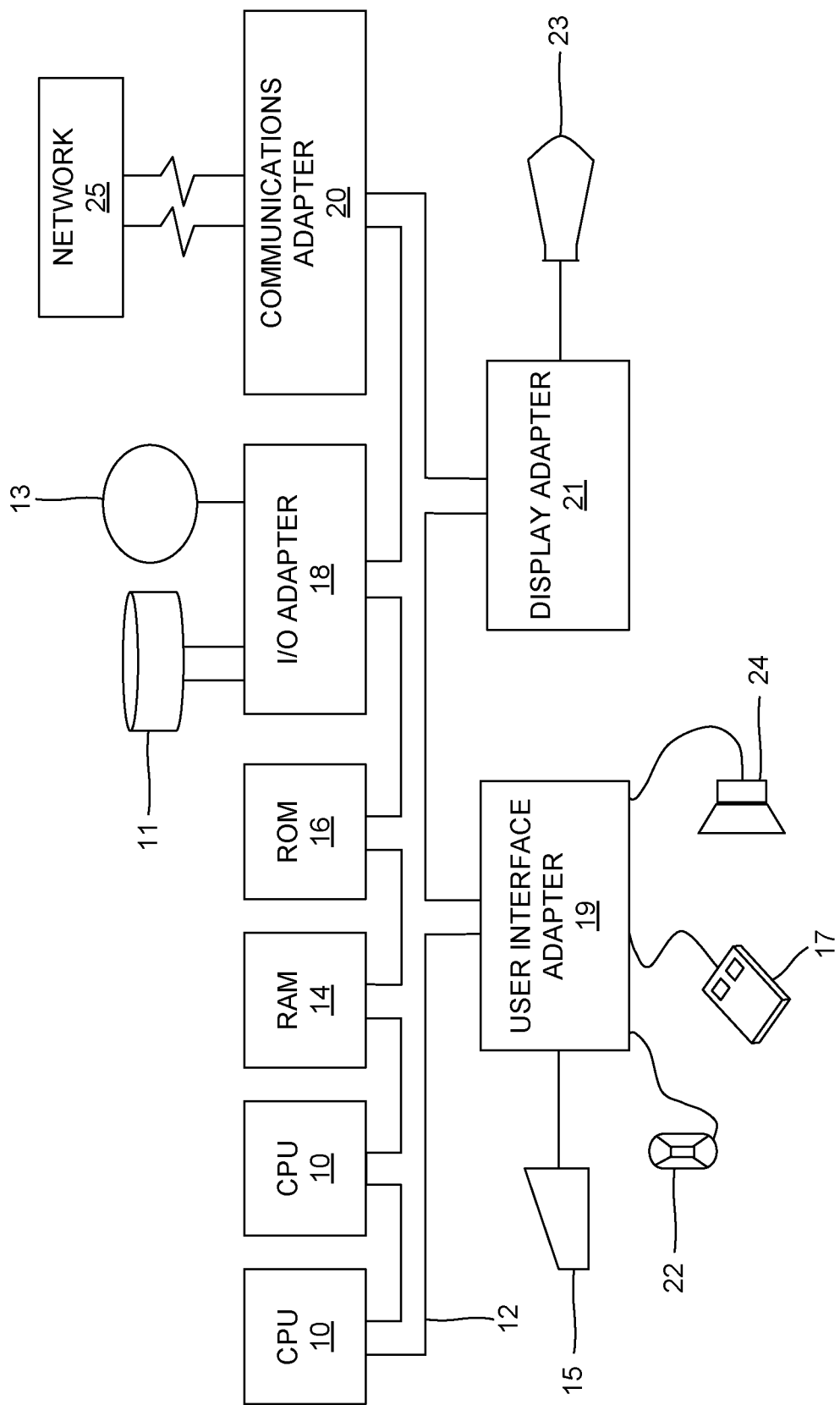
FIG. 5 illustrates a schematic view of a hardware configuration of device management/computer architecture according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The advantages of the device management system 102 as follows: one or more device 106A-N associated with the a device identifier (ID) that is created to monitor and track the changes made to the device 106. Apart from the creation of the identifier, the user can also create Security policies, NAT rules or any other configuration by providing the device ID without specifically tracking all the changes across the dynamic network 108. This process eases the task of manual intervention for tracking the changes in the network with effective time.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A device management system for tracking and managing one or more devices within one or more dynamic networks using a unique identifier, the device management system comprising:
    a memory unit that stores a database and a set of instructions, wherein the database comprises at least one of (i) a Unique Identification (ID) associated with the one or more devices, (ii) a Unique Internet Protocol (IP) address associated with the one or more dynamic networks; and
    a processor that executes the set of instructions and is configured to:
    obtain (i) information associated with one or more devices that are communicated with a first dynamic network from one or more dynamic networks, and (ii) a unique Internet Protocol (IP) address associated with the one or more dynamic networks, wherein the information associated with the one or more devices is stored in the database;
    generate a unique identification (ID) for each device that is communicated with the first dynamic network from one or more dynamic networks, using a certificate that corresponds to each device;
    identify switching in the IP address of the one or more devices within the one or more dynamic networks by analyzing a configuration of the unique ID of the one or more devices with an IP address of the one or more dynamic networks;
    generate a report for actions performed on one or more devices at periodical instance by analyzing the switching in the IP address of the one or more devices within the one or more dynamic networks: and
    enable an admin or a user to track and manage the one or more devices within the one or more dynamic networks by providing an alert based on the instances performed on each device.

2. The system of claim 1, wherein the processor is configured to automatically update the workflow for the device that is switched when the unique ID of the switched device is configured with a new IP address.

3. The system of claim 1, wherein said information associated with the one or more devices comprises at least one of device name, a device locality, a device state or a device certificate.

4. The system of claim 1, wherein the processor is configured to enable the admin or the user, using the user interface, to generate the unique ID of the device based on the certificate of the device and the IP address of the dynamic network that the device connects with.

5. The system of claim 1, wherein the processor is configured to map the actions of each device to generate the report, wherein the processor is configured to enable the admin or user to access the generated report using the user interface to track and manage the one or more devices configured in the one or more dynamic networks.

6. The system of claim 1, wherein the processor is configured to automatically generate a workflow to update security policies based on a new IP address of the one or more devices when the unique ID of the one or more devices is switched within the one or more dynamic networks.

7. A method for tracking and managing one or more devices within one or more dynamic networks using a unique identifier using a device management system, said method comprising:
    obtaining (i) information associated with the one or more devices that are communicated with a first dynamic network from the one or more dynamic networks, (ii) a unique Internet Protocol (IP) address associated with the one or more dynamic networks;
    generating a unique identification for each device that is communicated with the first dynamic network from one or more dynamic networks using a certificate that corresponds to each device;
    identifying a switching in the IP address of a device within the at least one dynamic network of by analyzing a configuration of the unique ID of each device with at least one of an IP address of the one or more dynamic networks;
    generating a report for actions performed on one or more devices at the periodical interval by analyzing the switching in the IP address of the one or more devices within the one or more dynamic networks; and
    enabling an admin or a user to track and manage the one or more devices within the one or more dynamic networks by providing an alert based on the instances performed on each device.

8. The method of claim 7, wherein the method comprises enabling the admin or the user, using the user interface, to generate the unique ID of the device based on the certificate of the device and the IP address of the dynamic network that the device connects with.

9. The method of claim 7, wherein the method comprises mapping the actions of each device to generate the report and enabling the admin or user to access the generated report using the user interface to track and manage the one or more devices configured in the one or more dynamic networks.

10. The method of claim 7, wherein the method comprises automatically generating a workflow to update security policies based on a new IP address of the one or more devices when the unique ID of the one or more devices is switched within the one or more dynamic networks.

11. One or more non-transitory computer-readable storage mediums storing the one or more sequences of instructions, which when executed by one or more processors, further causes a method for tracking and managing one or more devices within one or more dynamic networks using a unique identifier using a device management system, said method comprising
- obtaining (i) information associated with the one or more devices that are communicated with a first dynamic network from the one or more dynamic networks, (ii) a unique Internet Protocol (IP) address associated with the one or more dynamic networks;
- generating a unique identification for each device that is communicated with the first dynamic network from one or more dynamic networks using a certificate that corresponds to each device;
- identifying a switching in the IP address of a device within the at least one dynamic network of by analyzing a configuration of the unique ID of each device with at least one of an IP address of the one or more dynamic networks;
- generating a report for actions performed on one or more devices at a periodical interval by analyzing the switching in the IP address of the one or more devices within the one or more dynamic networks; and
- enabling an admin or a user to track and manage the one or more devices within the one or more dynamic networks by providing an alert based on the instances performed on each device.

12. The one or more non-transitory computer-readable storage mediums storing the one or more sequences of instructions of claim 11, wherein the method comprises enabling the admin or the user, using the user interface, to generate the unique ID of the device based on the certificate of the device and the IP address of the dynamic network that the device connects with.

13. The one or more non-transitory computer-readable storage mediums storing the one or more sequences of instructions of claim 11, wherein the method comprises automatically generating a workflow to update security policies based on a new IP address of the one or more devices when the unique ID of the one or more devices is switched within the one or more dynamic networks.

14. The one or more non-transitory computer-readable storage mediums storing the one or more sequences of instructions of claim 11, wherein the method comprises mapping the actions of each device to generate the report and enabling the admin or user to access the generated report using the user interface to track and manage the one or more devices configured in the one or more dynamic networks.

* * * * *